(12) United States Patent
Godwin et al.

(10) Patent No.: US 8,983,630 B2
(45) Date of Patent: Mar. 17, 2015

(54) REAL TIME EVENT VIEWING ACROSS DISTRIBUTED CONTROL SYSTEM SERVERS

(75) Inventors: Daniel Godwin, Burswood (AU); Jason Le-On Chong, Mount Hawthorn (AU); Walter Kelly Tan De Jesus, Canning Vale (AU); David Granatelli, Lilyfield (AU); Chris Michael Gilbert, Wavell Heights (AU); Craig Stuart Ashley, Lane Cove (AU)

(73) Assignee: Honeywell International Inc., Morristown, NJ (US)

(*) Notice: Subject to any disclaimer, the term of this patent is extended or adjusted under 35 U.S.C. 154(b) by 561 days.

(21) Appl. No.: 13/288,672

(22) Filed: Dec. 1, 2011

(65) Prior Publication Data

US 2013/0144404 A1 Jun. 6, 2013

(51) Int. Cl.
| *G05B 15/00* | (2006.01) |
| *G06F 15/16* | (2006.01) |
| *G06F 7/00* | (2006.01) |
| *G06F 17/30* | (2006.01) |
| *G06F 12/00* | (2006.01) |

(52) U.S. Cl.
USPC .............. 700/1; 709/201; 709/217; 707/781; 707/822; 707/825

(58) Field of Classification Search
CPC ................. G05B 19/418; G05B 2219/25232; G05B 2219/32406; H04L 41/5096; H04L 67/2842
USPC ................... 709/201, 217; 707/781, 822, 825
See application file for complete search history.

(56) References Cited

U.S. PATENT DOCUMENTS

| 6,421,571 | B1* | 7/2002 | Spriggs et al. ................. 700/17 |
| 6,788,980 | B1* | 9/2004 | Johnson .......................... 700/1 |
| 7,539,724 | B1 | 5/2009 | Callaghan |
| 8,266,273 | B2* | 9/2012 | Hanking ....................... 709/224 |
| 2004/0182574 | A1 | 9/2004 | Adnan et al. |
| 2008/0133733 | A1 | 6/2008 | Hanking |
| 2009/0292759 | A1 | 11/2009 | Piper et al. |
| 2010/0333102 | A1 | 12/2010 | Balasubramanian |

FOREIGN PATENT DOCUMENTS

KR 20060040371 5/2006

* cited by examiner

*Primary Examiner* — Ronald Hartman, Jr.
(74) *Attorney, Agent, or Firm* — Jetter & Associates, P.A.

(57) ABSTRACT

An automated event viewing method for a process control network that includes a plurality of distributed control system (DCS) servers that receive process event data from one or more industrial processes, wherein each DCS server is connected to one or more operator consoles for monitoring the one or more industrial processes. The method includes receiving process event data of the industrial processes in real time from the plurality of DCS servers and transmitting in real time the process event data of the industrial processes to one or more operator consoles that are not connected to the DCS server from which the process event data originated.

17 Claims, 3 Drawing Sheets

REAL TIME EVENT VIEWING ACROSS DISTRIBUTED CONTROL SYSTEM SERVERS

FIELD

Disclosed embodiments relate to the field of process automation systems, and more particularly to the management of problems exhibited by process automation systems.

BACKGROUND

A process automation system refers to a monitoring and control system, usually of an industrial system or a set of industrial processes, in which a distributed control system (DCS) may utilize controller elements to monitor and control the industrial processes. Each DCS is operated by a DCS server that sends information to human operators who monitor and control the industrial processes via an operator console. A single DCS may contain multiple operator consoles and each console may contain multiple stations. Each station is used to notify human operators of industrial process conditions via alarms and viewable data. The multiple distributed control systems may be connected by a process control communications network.

FIG. 1, for example, shows a conventional process automation system 100 including multiple DCS's 102, 112 and 122 connected via a process control network 150. Each DCS includes one or more servers and one or more controllers for controlling one or more industrial processes. DCS 102 includes server 104 and controller 105 for controlling industrial process 109. Likewise, DCS 112 includes server 114 and controller 115 for controlling industrial process 119 and DCS 122 includes server 124 and controller 125 for controlling industrial process 129. Furthermore, each DCS is associated with one or more consoles, to which the DCS sends data (i.e., process event data) about the industrial processes it monitors and controls. DCS 102 is connected to console 106, which displays information in station 107 for viewing by a human operator 108. Likewise, DCS 112 is connected to console 116, which displays information in station 117 for viewing by a human operator 118 and DCS 122 is connected to console 126, which displays information in station 127 for viewing by a human operator 128.

In the system 100 shown in FIG. 1, human operators may view process event data on a console or station that is connected to a DCS that receives the process event data from only the particular industrial process that is controlled by that DCS. Human operator 108, for example, may view process event data about industrial process 109, which is reported to the DCS 102 and relayed to console 106. Human operator 108 may also view event data on console 106, where the system events include data about the DCS 102 itself (e.g. a hardware failure, failed login). But such conventional systems do not allow human operators to view process event data that originates from an industrial process that is not monitored or controlled by the DCS that corresponds to the human operator's console. Human operator 108, for example, may not view real time process event data about industrial process 119, which is reported to the DCS 112, since the console of operator 108 is not communicably connected to the DCS 112. As known in the art of control systems and used herein, "real time" refers to the response time for any event not being more than the scan time. In real systems, most control loops in a DCS-based system have a scan time of about 0.5 to 2 s.

This aspect of conventional process automation system limits the effectiveness and the abilities of human operators monitoring a process automation system including a plurality of DCS, since these individuals are limited to monitoring a subset of the process event data of the entire system. The aforementioned shortcoming also does not sufficiently avail itself of the networking capabilities of the process control network 150. Therefore, there is a need for a system for facilitating the viewing of process event data by human operators monitoring process automation systems having a plurality of DCS across multiple DCS's.

SUMMARY

Disclosed embodiments include an automated event viewing method for a process control network. The process control network includes a plurality of distributed control system (DCS) servers that receive process event data from one or more industrial processes, wherein each DCS server is connected to one or more operator consoles for monitoring the one or more industrial processes. The method includes receiving process event data of the industrial processes in real time from the plurality of DCS servers and transmitting in real time the process event data of the industrial processes to one or more operator consoles that are not connected to the DCS server from which the process event data originated.

A system for providing automated event viewing for a process control network includes a plurality of DCS servers that receive process event data from one or more industrial processes, wherein each DCS server is connected to one or more operator consoles for monitoring the one or more industrial processes. The system further includes a first DCS server, of the plurality of DCS servers, that is configured for receiving process event data of the industrial processes in real time from all other DCS servers and transmitting in real time the process event data of the industrial processes to one or more operator consoles that are not connected to the first DCS server.

DETAILED DESCRIPTION

Figure 1:
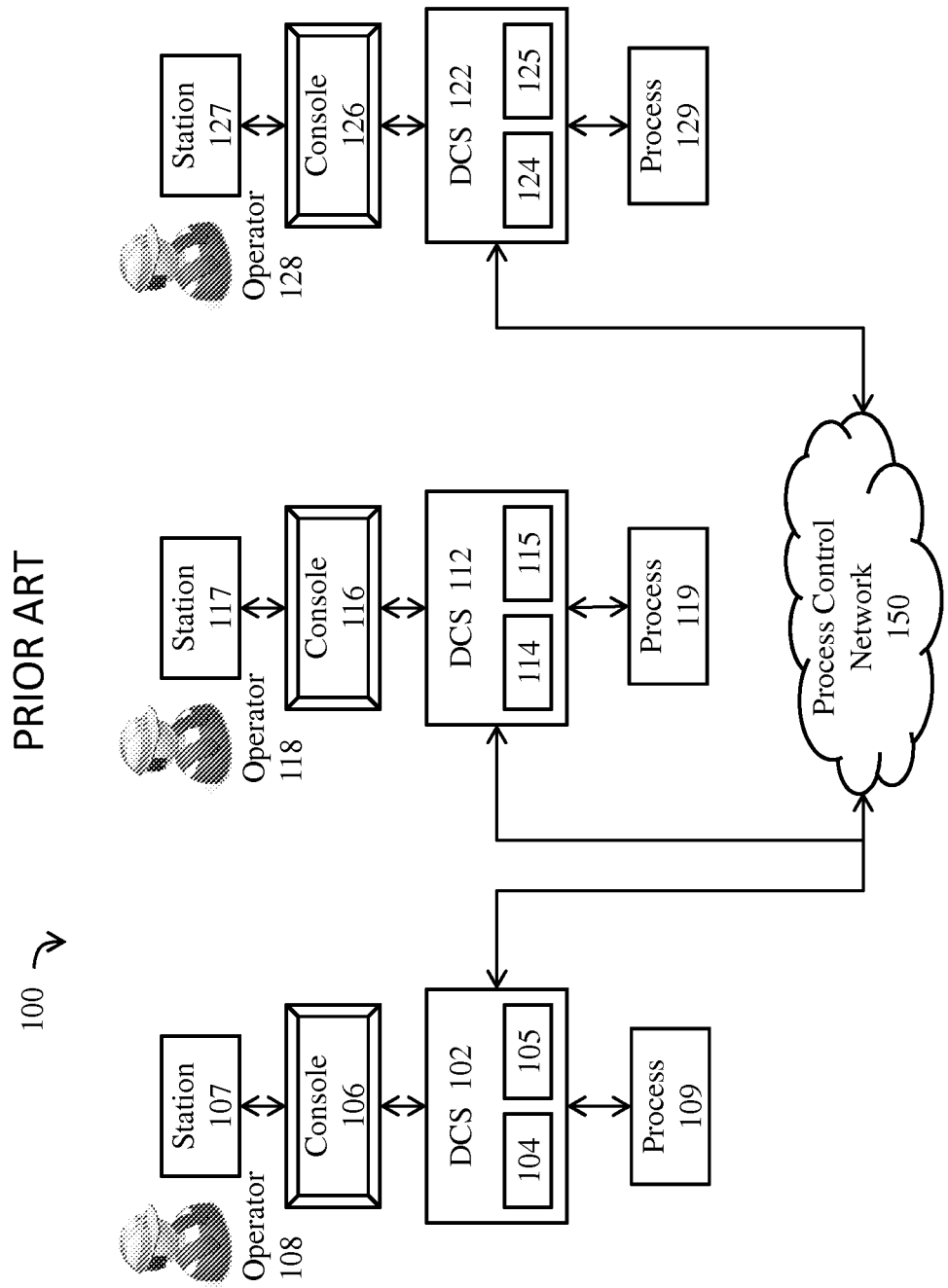
FIG. 1 is a block diagram of a conventional process automation system including multiple distributed control systems (DCS's).

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments. One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Figure 2:
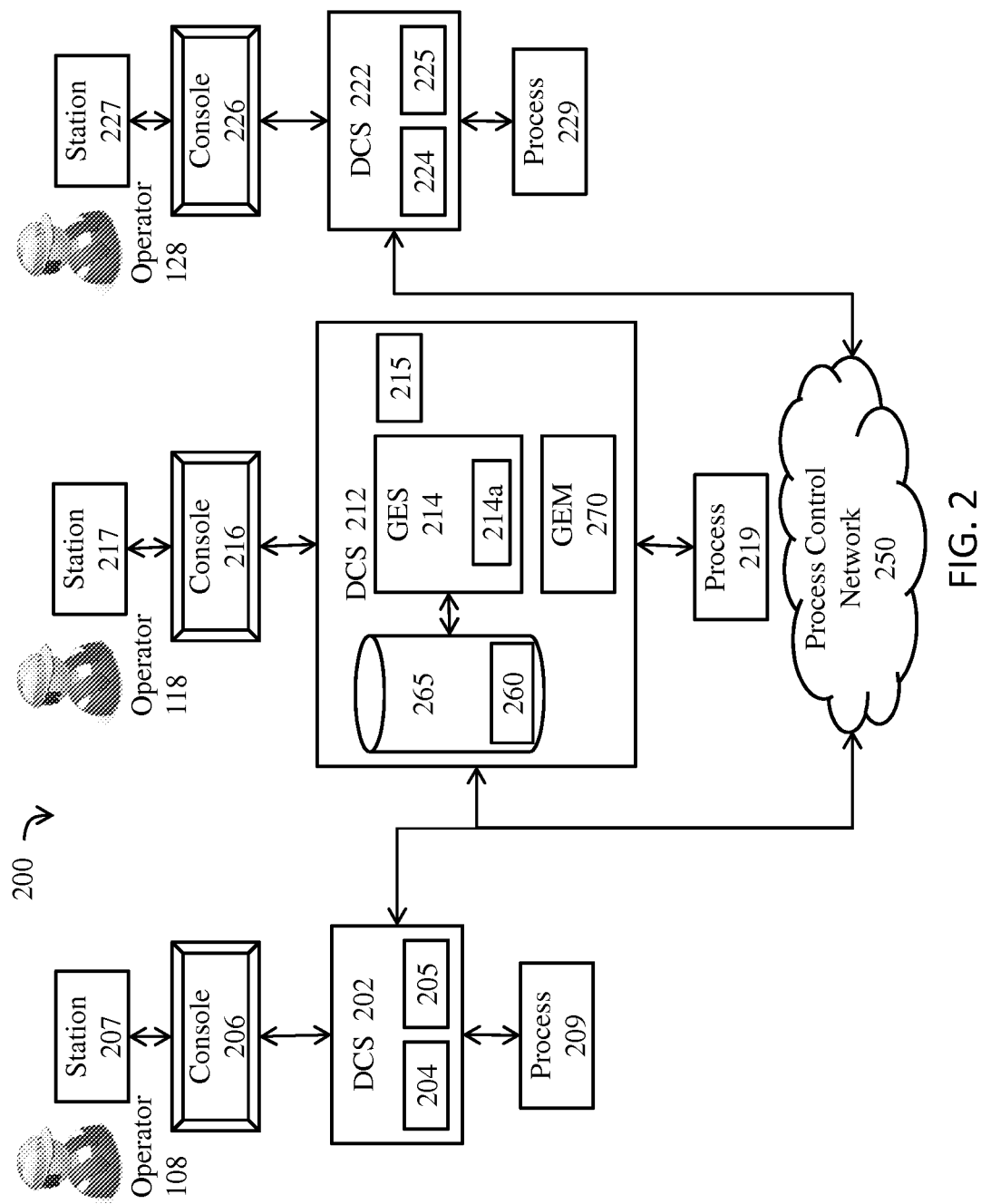
FIG. 2 is a block diagram of a process automation system including multiple DCS's that provides real time event operator' viewing of process data across multiple DCS's, according to an example embodiment.

Disclosed embodiments include methods and systems for globally distributing process event data in a process automation system. FIG. 2 is a block diagram of a process automation system 200 including multiple DCS's that provides real time event human operator viewing/monitoring of processes across multiple DCS's, according to an example embodiment. Although generally described as providing operator viewing/monitoring of processes across multiple DCS's, disclosed process automation system can also allow operator control of processes across multiple DCS's. As used herein, the term "human operator" also includes technicians, managers and engineers.

The term "process event data" refers to data, such as log messages, incident data, sensor data or the like, originating from industrial processes, such as processes 209, 219 and 229. Process event data may include a date/time stamp, a process identifier, a thread identifier, an error message or other data surrounding the process being monitored. Process event data may be in the form of a text message. Note that the system 200 shown in FIG. 2 generally supports any number of DCS's, any number of servers and controllers within each DCS, any number of consoles associated with each DCS, any number of stations associated with each console and any number of industrial processes associated with each DCS.

The components of process automation system 200 are similar to the components of process automation system 100, except that one of the DCS's in the system 200 shown as DCS 212 of process automation system 200 has been configured to act as a central repository and distribution center for process event data received from the various processes supported by system 200, shown as processes 209, 219 and 229 in FIG. 2. The server 214 of DCS 212 is designated as a Global Event Server (GES) 214 that is elected to receive, in real time, process event data from the plurality of DCS's (202, 212, and 222) and distribute it in a predefined manner. DCS 212 logically receives process event data from the industrial process 219 to which it corresponds, as described for the conventional process automation system 100. According to an example embodiment, the remaining DCS's of the process automation system 200, i.e., DCS 202 and DCS 222, publish, in real time, process event data from their respective industrial processes, i.e., process 209 and process 229, to GES 214. Consequently, GES 214 of DCS 212 receives process event data in real time from the plurality of industrial processes (209, 219, 229) of process automation system 200, regardless of which DCS corresponds to the industrial process.

In an example embodiment, the GES 214 subscribes to process event data from DCS 202 and DCS 222 by sending a subscribe message or command to DCS 202 and DCS 222. Such communications can be by wired (e.g., cable) or wireless communications (e.g., RF). Consequently, DCS 202 and DCS 222 are configured to immediately publish the process event data they receive to GES 214. This results in DCS 202 and DCS 222 automatically transmit, in real time, the process event data they receive to GES 214. As a result, GES 214 is privy to the process event data from the plurality of industrial processes of process automation system 200.

In an example embodiment, the GES 214 stores the process event data it receives in a non-transitory machine readable storage 265 shown having a stored database (DB) 260 in FIG. 2, which may be a relational database. A relational database as used herein is a database that matches data by using common characteristics found within the data set, and the resulting groups of data are organized for ease of understanding. Such a grouping uses the relational model. Accordingly such a database is called a "relational database." The software used to do this grouping is generally called a relational database management system (RDBMS). The database 260 may further comprise a Structured Query Language (SQL) database stored in a SQL server. SQL can be employed to access data, and also to define the form of the database, i.e., describe the tables, and describe indexes and views of the tables and other objects of the database. SQL is a high level programming language specifically designed for the database product. In another example embodiment, the GES 214 stores the process event data it receives in machine readable storage 265 comprising a real time data cache 214a, which may comprise a fixed size, time sorted, list of process event data.

Subsequent to receiving and storing process event data, the GES 214 can utilize a Global Event Manager (GEM) 270, which may comprise a computer program executing on GES 214, to calculate how, and to whom, to transmit the process event data. In an example embodiment, a human operator may utilize a graphical user interface (GUI) on his station or console to specify which process event data the human operator desires to monitor. Consequently, the station or console transmits a message, via the DCS to which it is connected, to the GEM 270 identifying the process event data specified by the human operator. The message may include a process event data identifier, for example, which indicates the type of process event data desired. The GEM 270 may store in database 260 any data specified by the human operator, wherein the data is stored in a settings file associated with the station or console of the human operator. Using the process event data identifier provided by the human operator, in the course of receiving process event data from the plurality of DCS's, the GEM 270 identifies the process event data specified for the particular console or station and transmits the process event data that was specified to the particular console or station.

A console, such as consoles 206, 216 and 226, may comprise a graphical display, or an area of a graphical display, in a physical monitor or viewing screen. A station may comprise a subset of a console that is dedicated to one industrial process, a related set of industrial processes or process event data that is grouped together. A console and/or station generates graphical user interfaces that display process event data garnered from the industrial processes of process automation system 200 for viewing by a human operator. A console or station may comprise a computer with a display, a processor, and user input devices, such as a keyboard, mouse, touch screen and/or a microphone.

In another example embodiment, a human operator may utilize a GUI on his or her station or console to specify additional information pertaining to the process event data the human operator desires to monitor. For example, the human operator may specify any filters applied by the human operator on the process event data being viewed, a current scroll position of the process event data in the console or station and the sorting order for the process event data. The GEM 270 may store the data specified by the human operator in the settings file in database 260. Other data pertaining to the process event data the human operator can monitor can include the scope of responsibility of the operator, which can be defined as part of the DCS configuration, defined by a system administrator, and stored in database 260. In the course of receiving process event data from the plurality of DCS's, the GEM 270 uses the data specified by the human operator, and the operator's scope of responsibility, to identify the process event data corresponding to a particular console or station and transmits the identified data to the particular console or station.

A scope of responsibility may include one or more indicators as to the responsibilities of the human operator and may correspond to predefined process event data. In one embodiment, a lookup table is used to define which predefined process event data corresponds to a scope of responsibilities of a human operator, as defined by a system administrator. A human operator's scope of responsibility defines those processes for which the operator is responsible. A filter defined by the human operator may include one or more indicators as to the process event data the human operator may or may not desire to view. A filter may include one or more process event data types, and, for each type, a positive or negative indicator as to whether the human operator does or does not desire to view the aforementioned process event data type. A current scroll position refers to a date/time period of interest that is currently viewable on a station or console being viewed by a human operator. The sorting order refers to a process event data point of interest that is currently viewable on the station or console used by the human operator (e.g., date and time, process point id, priority).

Figure 3:
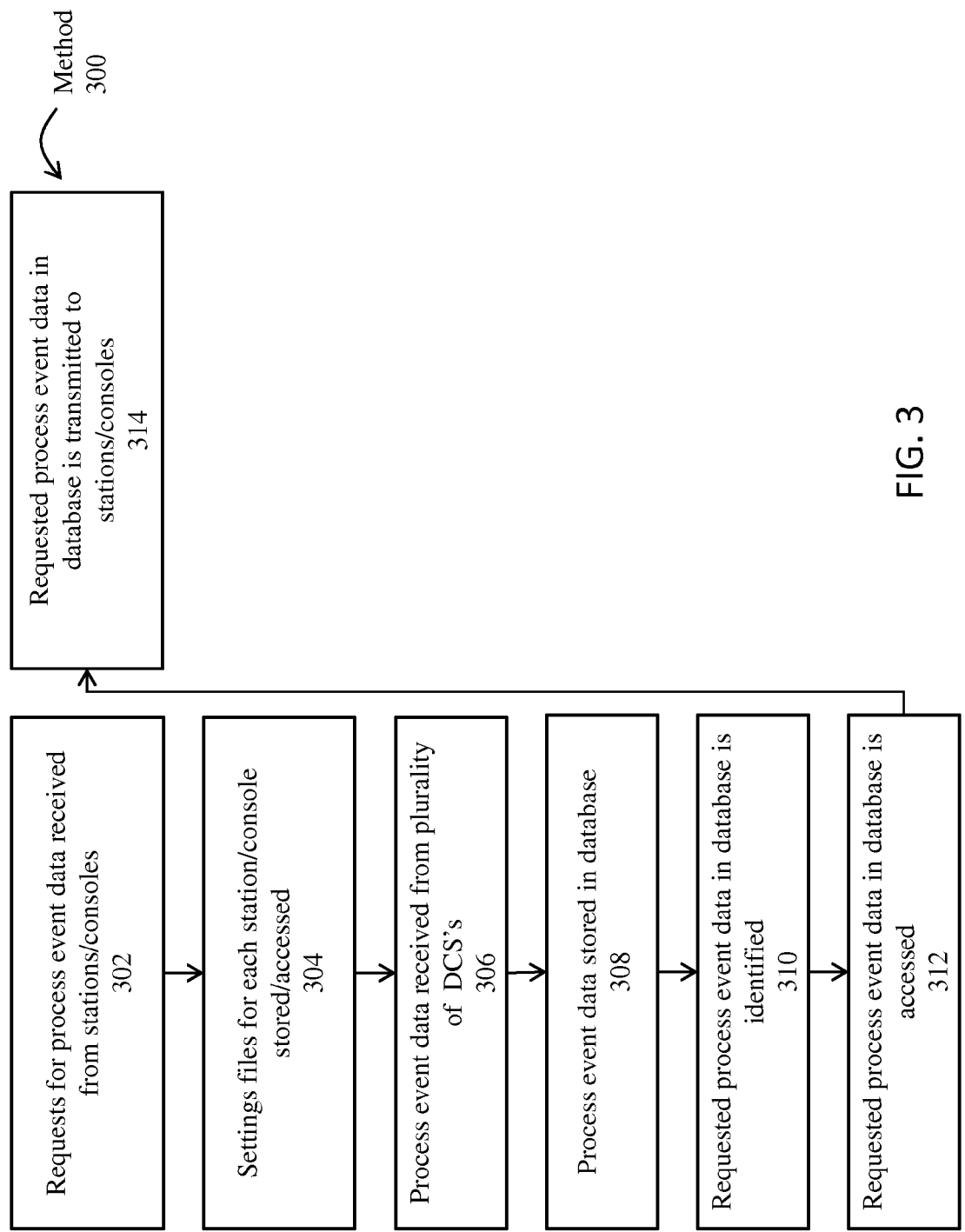
FIG. 3 is a flow chart illustrating the control flow of an example method for performing real time event viewing processes in a process automation system, according to an example embodiment.

FIG. 3 is a flow chart illustrating the control flow of an example method 300 for performing real time event viewing processes in a multiple DCS process automation system, according to an example embodiment. In a first step 302, GEM 270 receives requests over the process control network 250 from one or more operator consoles and/or stations for process event data. Each request may include various data pertaining to the type of data the human operator of the station of console desires to monitor, such as: at least one identifier for process event data, a scope of responsibility of the human operator of the station or console (wherein the scope of responsibility corresponds to predefined process event data), a filter for the station or console (as defined above), or the like. In step 304, the GEM 270, using a disclosed algorithm, stores the data received in step 302 in one or more settings files in database 260, wherein each settings file is associated with one station or console and wherein each settings file specifies the type of data the human operator of the station of console desires to monitor. The settings file may be regarded as storing the view configuration desired by an operator for a particular station or console.

Note that steps 302 and 304 may occur at any time during the method 300. The process wherein GEM 270 receives requests for process event data from one or more operator consoles and/or stations, and wherein GEM 270 stores those preferences in settings files, may occur in parallel and in conjunction with the remaining processes described in method 300. In this manner, the process event data desired for viewing by console and stations may be changed over time and taken into account each time the GEM 270 identifies process event data for transmission to each console or station in step 310.

In step 306, the GES 214 receives process event data of the industrial processes 209, 219, 229 in real time from the plurality of DCS servers of system 200. In step 308, the GES 214 stores the process event data that was received in a database 260, which may be a real time data cache 214a.

In step 310, the GEM 270, using a disclosed algorithm, determines which process event data in the database 260 corresponds to each operator or console, according to the data that was specified by each station or console in step 302 and stored in database 260. Step 310 comprises reading the settings file in database 260 for each station or console and matching the settings file data to process event data stored in database 260, in order to determine which process event data is desired for viewing for each station or console.

In step 312, the GEM 270, using a disclosed algorithm, accesses or reads the process event data that was identified in step 310. In step 314, the GEM 270 transmits in real time, over the process control network 250, the process event data that was accessed in step 312 to the stations or consoles to which the process event data corresponds. The process event data transmitted in step 314 may be transmitted to stations or consoles that are not connected to the DCS server from which the process event data originated.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include non-transitory media including the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

Computer program code for carrying out operations of the disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The Disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a physical computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

We claim:

1. An automated event viewing method for a process control network including a plurality of distributed control systems (DCS) each including DCS servers that receive process event data from one or more industrial processes, wherein each of the DCS servers is connected to one or more operator consoles for monitoring the one or more industrial processes, comprising:
designating one of the plurality of DCS servers as a global event server (GES), wherein the GES includes an associated non-transitory machine readable storage;
storing received process event data in the non-transitory machine readable storage of the GES from the industrial processes in real time from each of the DCS, and
transmitting in real time the process event data of the industrial processes from the non-transitory machine readable storage of the GES to one or more of the operator consoles that are not connected to the DCS from which the process event data originated.

2. The method of claim 1, wherein the operator consoles in any of the DCS are able to view the process event data from any or all of the DCS.

3. The method of claim 2, wherein the step of
storing the process event data comprises storing in a real time data cache.

4. The method of claim 3, wherein the step of transmitting in real time the process event data further comprises:
accessing the process event data from the real time data cache; and
transmitting in real time the process event data of the industrial processes to the one or more operator consoles.

5. The method of claim 2, wherein the step of transmitting in real time the process event data further comprises:
receiving requests from the one or more operator consoles for the process event data originating from one or more of the DCS to which the one or more operator consoles are not connected; and
transmitting in real time the process event data that was requested of the industrial processes to the one or more operator consoles.

6. The method of claim 5, wherein the step of receiving requests from the one or more operator consoles further comprises:
receiving requests from the one or more operator consoles for process event data, wherein each request includes at least one identifier.

7. The method of claim 6, wherein the step of transmitting in real time the process event data further comprises:
identifying the process event data that was requested by the one or more operator consoles, based on the at least one identifier in each request; and
transmitting in real time the process event data that was identified to the one or more operator consoles.

8. The method of claim 6, further comprising:
storing a settings file for each of the one or more operator consoles that sent requests for the process event data, wherein each settings file includes one or more identifiers for the process event data.

9. The method of claim 8, wherein the step of transmitting in real time the process event data further comprises:
identifying the process event data that was requested by the one or more operator consoles, based on the settings file associated with each operator console; and
transmitting in real time the process event data that was identified to the one or more operator consoles.

10. A system for providing automated event viewing for a process control network, comprising:
a plurality of distributed control systems (DCS) each including DCS servers that receive process event data from one or more industrial processes, wherein each of the DCS servers is connected to one or more operator consoles for monitoring the one or more industrial processes, and wherein a first DCS server, of the plurality of DCS servers, is configured as a global event server (GES), wherein the GES includes an associated non-transitory machine readable storage and is configured for:
storing received process event data in the non-transitory machine readable storage of the GES from of the industrial processes in real time from all other DCS; and
transmitting in real time the process event data of the industrial processes from the non-transitory machine readable storage of the GES to one or more of the operator consoles that are not connected to the GES from which the process event data originated.

11. The system of claim 10, wherein the operator consoles in any of the DCS are able to view the process event data from any or all of the DCS.

12. The system of claim 11, wherein the process event data stored in the non-transitory machine readable storage of the GES is stored in a data cache.

13. The system of claim 11, wherein the GES is further configured for:

receiving requests from the one or more operator consoles for process event data originating from one or more of the DCS to which the one or more operator consoles are not connected; and transmitting in real time the process event data of the industrial processes to the one or more operator consoles.

14. The system of claim 13, wherein the GES is further configured for:

receiving requests from the one or more operator consoles for the process event data, wherein each request includes at least one identifier.

15. The system of claim 14, wherein the GES is further configured for:

identifying the process event data that was requested by the one or more operator consoles, based on the at least one identifier in each of the requests; and transmitting in real time the process event data that was identified to the one or more operator consoles.

16. The system of claim 13, wherein the GES is further configured for:

storing a settings file for each of the one or more operator consoles that sent the requests for the process event data, wherein each settings file includes one or more identifiers for the process event data.

17. The system of claim 16, wherein the GES is further configured for:

identifying the process event data that was requested by the one or more operator consoles, based on the settings file associated with each of the operator consoles; and transmitting in real time the process event data that was identified to the one or more operator consoles.

* * * * *